(12) United States Patent
Zheng et al.

(10) Patent No.: US 12,224,565 B2
(45) Date of Patent: Feb. 11, 2025

(54) ADAPTOR PLATE FOR SECURING DIN RAIL DEVICE TO AN ELECTRICAL JUNCTION BOX

(71) Applicants: Honeywell International Inc., Morris Plains, NJ (US); Xinyan Zheng, Morris Plains, NJ (US); Haitao Li, Morris Plains, NJ (US); Wei Chen, Morris Plains, NJ (US); Xuewei Liu, Morris Plains, NJ (US); Bhavesh Gupta, Morris Plains, NJ (US)

(72) Inventors: Xinyan Zheng, Morris Plains, NJ (US); Haitao Li, Morris Plains, NJ (US); Wei Chen, Morris Plains, NJ (US); Xuewei Liu, Morris Plains, NJ (US); Bhavesh Gupta, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 157 days.

(21) Appl. No.: 17/753,384

(22) PCT Filed: Sep. 6, 2019

(86) PCT No.: PCT/CN2019/104624
§ 371 (c)(1),
(2) Date: Mar. 1, 2022

(87) PCT Pub. No.: WO2021/042350
PCT Pub. Date: Mar. 11, 2021

(65) Prior Publication Data
US 2022/0344919 A1    Oct. 27, 2022

(51) Int. Cl.
*H02G 3/08*    (2006.01)
(52) U.S. Cl.
CPC ..................... *H02G 3/08* (2013.01)

(58) Field of Classification Search
CPC ................ H02G 3/085; H02G 3/16
See application file for complete search history.

(56) References Cited

U.S. PATENT DOCUMENTS

| | | | |
|---|---|---|---|
| 4,931,903 A | | 6/1990 | Cole |
| 5,239,129 A | * | 8/1993 | Ehrenfels .............. H02G 3/14 |
| | | | 361/641 |

(Continued)

FOREIGN PATENT DOCUMENTS

| | | |
|---|---|---|
| CN | 101627507 A | 1/2010 |
| CN | 201741990 U | 2/2011 |

(Continued)

OTHER PUBLICATIONS

ETC Installation Guide, Low Voltage DIN rail Cover Kit, Electronic Theatre Controls, Inc., Feb. 2016 (1 page).

(Continued)

*Primary Examiner* — Hung V Ngo
(74) *Attorney, Agent, or Firm* — Seager, Tufte & Wickhem, LLP

(57) ABSTRACT

An adaptor plate includes a front plate that is configured to span across at least a portion of a front of an electrical junction box and includes one or more adaptor plate mounting features configured to align with corresponding mounting features of the electrical junction box. A DIN rail engagement portion extends backward from the front plate (and into the junction box) and is configured to fit at least partially into an elongated DIN rail mounting recess of a DIN rail device. In some cases, a first mounting slot is disposed within a first side of the DIN rail engagement portion for receiving a first mounting latch of the DIN rail device, and a second mounting slot is disposed within a second side of the DIN rail engagement portion for receiving a second mounting latch of the DIN rail device.

10 Claims, 11 Drawing Sheets

(56) References Cited

U.S. PATENT DOCUMENTS

| | | | | |
|---|---|---|---|---|
| 5,934,935 | A | * | 8/1999 | Kameyama .............. H02G 3/16 |
| | | | | 439/535 |
| 2010/0035464 | A1 | * | 2/2010 | Capaldi-Tallon .... H01R 9/2608 |
| | | | | 439/532 |
| 2012/0182698 | A1 | | 7/2012 | Langels et al. |
| 2014/0251680 | A1 | * | 9/2014 | Reed ....................... C23F 13/22 |
| | | | | 174/541 |
| 2017/0047719 | A1 | * | 2/2017 | Maziere ................... H02G 1/14 |
| 2017/0237211 | A1 | | 8/2017 | Read et al. |
| 2018/0205211 | A1 | * | 7/2018 | Mauer ..................... H02G 3/086 |
| 2018/0323594 | A1 | * | 11/2018 | Barnett .................... H02G 3/16 |
| 2019/0348793 | A1 | * | 11/2019 | Boe ...................... H01R 13/516 |
| 2020/0303912 | A1 | * | 9/2020 | Smolik .................... H02G 3/12 |
| 2020/0378553 | A1 | * | 12/2020 | Oh ......................... H02G 3/125 |
| 2022/0030731 | A1 | * | 1/2022 | Oh ......................... H02G 3/125 |
| 2022/0278514 | A1 | * | 9/2022 | Korcz .................... H02G 3/126 |

FOREIGN PATENT DOCUMENTS

| | | |
|---|---|---|
| CN | 203983734 U | 12/2014 |
| CN | 107305992 A | 10/2017 |
| FR | 3003120 B1 | 3/2017 |
| JP | 07162167 A | 6/1995 |

OTHER PUBLICATIONS

DIN rail, Wikipedia, https://en.wikipedia.org/wiki/DIN_rail, Jul. 25, 2019 (4 pages).

IP66 General Purpose Enclosures, Hylec, https://www.hylec-apl.com/IP66-General-Purpose-Enclosures.html, Jul. 25, 2019 (2 pages).

In-Box, OKW Gehause Systeme, Jul. 25, 2019 (8 pages).

* cited by examiner

ADAPTOR PLATE FOR SECURING DIN RAIL DEVICE TO AN ELECTRICAL JUNCTION BOX

TECHNICAL FIELD

The present disclosure relates generally to electrical junction boxes and more particularly to adaptor plates for securing electrical devices to electrical junction boxes.

BACKGROUND

A variety of DIN rail devices are known. There are situations in which it would be desirable to be able to easily mount a DIN rail device within an electrical junction box. There are electrical junction boxes known that are adapted to permit securement of a short DIN rail section to be secured relative to a back wall of the electrical junction box. This requires that there be sufficient room within the electrical junction box to be able to secure the DIN rail section, and then secure the DIN rail device to the DIN rail section, all while avoiding electrical wiring that is present in the junction box. Typically, a DIN rail device must be pivoted into position on the DIN rail section, thus requiring even more room. What would be desirable is an improved way of mounting a DIN rail device in a junction box.

SUMMARY

The present disclosure relates generally to an adaptor plate for securing electrical devices to electrical junction boxes. A particular example of the disclosure is an adaptor plate that is configured to secure a DIN rail device inside of an electrical junction box. The adaptor plate is securable to a front of the electrical junction box with the DIN rail device secured to the adaptor plate and disposed within the electrical junction box. The adaptor plate may include a front plate that is configured to span across at least a portion of a front of the electrical junction box. The front plate may include one or more adaptor plate mounting features located relative to the front plate such that the one or more adaptor plate mounting features align with corresponding mounting features on the electrical junction box. A DIN rail engagement portion may extend backward from the front plate (i.e. into the junction box) and may be configured to fit at least partially into an elongated DIN rail mounting recess of a DIN rail device. The DIN rail engagement portion may have a first side spaced from a second side, wherein the first side is configured to extend lengthwise along a first side of the DIN rail mounting recess of the DIN rail device, The second side may be configured to extend lengthwise along a second side of the DIN rail mounting recess of the DIN rail device. In some cases, a first mounting slot may be disposed within the first side of the DIN rail engagement portion for receiving a first mounting latch of the DIN rail device that extends into the DIN rail mounting recess from the first side of the DIN rail mounting recess. A second mounting slot may be disposed within the second side of the DIN rail engagement portion for receiving a second mounting latch of the DIN rail device that extends into the DIN rail mounting recess from the second side of the DIN rail mounting recess.

Another example of the disclosure may be found in an assembly for mounting a DIN rail device relative to an electrical junction box. The assembly may include a DIN rail device that is configured to fit within the electrical junction box, along with an adaptor plate. The DIN rail device may include a housing that includes a rear portion, and a recess formed within the rear portion of the housing that may be configured for securement to a DIN rail. The recess may include a stationary mounting latch and a movable mounting latch. The movable mounting latch may be positioned across the recess and longitudinally offset from the stationary mounting latch. The adaptor plate may include a front plate that is configured to span across at least a portion of a front of the electrical junction box. The front plate may include one or more adaptor plate mounting features located relative to the front plate such that the one or more adaptor plate mounting features align with corresponding mounting features of the electrical junction box. The adaptor plate may also include a DIN rail engagement portion extending backward from the front plate (i.e. into the junction box) and may be configured to fit into the recess of the DIN rail device. The DIN rail engagement portion may include a first mounting slot for receiving at least part of the stationary mounting latch and a second mounting slot for receiving at least part of the movable mounting latch.

Another example of the disclosure includes a method of securing a DIN rail device having an elongated DIN rail mounting recess within an electrical junction box. An adaptor plate is provided that includes a front plate configured to span across at least a portion of a front of the electrical junction box. The front plate may include one or more adaptor plate mounting features located relative to the front plate such that the one or more adaptor plate mounting features align with corresponding mounting features on the electrical junction box. The adaptor plate may also include a DIN rail engagement portion extending backward (i.e. into the junction box) from the front plate and may be configured to fit at least partially into the elongated DIN rail mounting recess of the DIN rail device. The DIN rail engagement portion may have a first side spaced from a second side, wherein the first side is configured to extend lengthwise along a first side of the DIN rail mounting recess of the DIN rail device, and wherein the second side is configured to extend lengthwise along a second side of the DIN rail mounting recess of the DIN rail device. A first mounting slot may be disposed within the first side of the DIN rail engagement portion for receiving a first mounting latch of the DIN rail device that extends into the DIN rail mounting recess from the first side of the DIN rail mounting recess. A second mounting slot may be disposed within the second side of the DIN rail engagement portion for receiving a second mounting latch of the DIN rail device that extends into the DIN rail mounting recess from the second side of the DIN rail mounting recess. The first mounting latch and the second mounting latch of the DIN rail device may be placed in the first mounting slot and the second mounting slot, respectively, of the DIN rail engagement portion of the adaptor plate to form a sub-assembly, and the sub-assembly may be secured to the electrical junction box by extending fasteners through the one or more adaptor plate mounting features.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
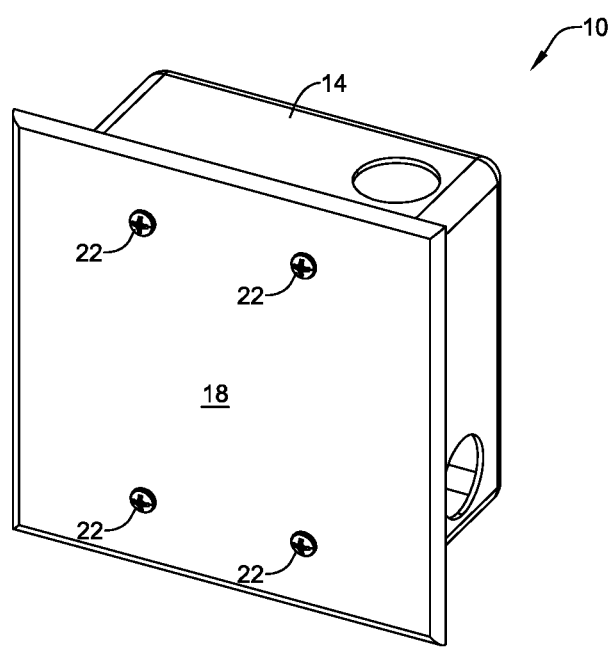
FIG. 1 is a perspective view of an illustrative assembly including a cover and a DIN rail device secured within an electrical junction box.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Figure 2:
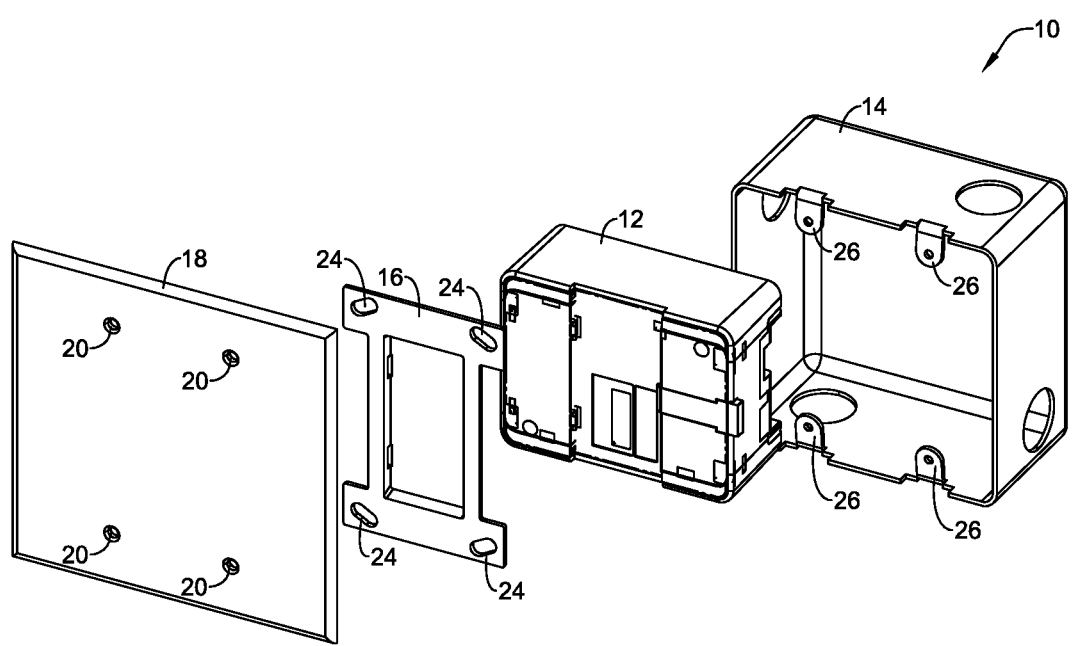
FIG. 2 is an exploded view of the illustrative assembly of FIG. 1.

FIG. 1 is a perspective view of an illustrative assembly 10 and FIG. 2 is an exploded view of the illustrative assembly 10. As can be seen, the illustrative assembly 10 includes a DIN rail device 12 that is secured within an electrical junction box 14. It will be appreciated that the DIN rail device 12 may be any sort of electrical device such as a switch, relay, or controller, for example, that is configured to be secured to a traditional DIN rail. As illustrated, the electrical junction box 14 is a double gang electrical junction box. In some cases, the electrical junction box 14 may be a triple gang electrical junction box or an even larger electrical junction box 14. A double gang electrical junction box is an electrical junction box that is configured to accommodate two electrical components such as two light switches or two power receptacles. A triple gang electrical box, therefore, is an electrical junction box that is configured to accommodate three such electrical components. In some cases, the electrical junction box 14 may be a single gang electrical junction box.

As will be discussed with respect to subsequent drawings, an adaptor plate 16 is configured to be releasably secured to the DIN rail device 12 and to be releasably secured to the electrical junction box 14. As a result, the adaptor plate 16 secures the DIN rail device 12 to the electrical junction box 14 without requiring any special adaptations to the electrical junction box 14 itself. While the illustrative assembly 10 shows a single adaptor plate 16 securing a DIN rail device 12 to the electrical junction box 14, it will be appreciated that depending on how large the electrical junction box 14 is, it may be possible, for example, to secure a pair or more) of DIN rail devices 12 within a sufficiently large electrical junction box 14, with an adaptor plate 16 secured to each of the DIN rail devices 12.

The illustrative assembly 10 also includes a cover 18 that may be secured to the electrical junction box 14 and/or adaptor plate 16 to help prevent accidental contact with any electrical contacts/wires of the DIN rail device 12. The cover 18 may also provide a more finished appearance to the illustrative assembly 10. The illustrative cover 18 includes mounting apertures 20 through which fasteners 22 may extend in order to secure the cover 18 relative to the electrical junction box 14 and/or adaptor plate 16. While illustrated as screws, the fasteners may also be bolts or any other threaded or non-threaded fastener. In some cases, the fasteners 22 extending through the mounting apertures 20 may extend through mounting features 24 that are formed within the adaptor plate 16 and may threadedly engage threaded apertures 26 that are formed within the electrical junction box 14. It will be appreciated that the threaded apertures 26 may be considered as being configured to threadedly engage screws or other fasteners that could be used to secure traditional components such as a light switch or a receptacle within the electrical junction box 14. In some cases, the cover 18 may be secured to the electrical junction box 14 and/or adaptor plate 16 via a snap fit, such as a latch, or other securement mechanism.

Figure 3:
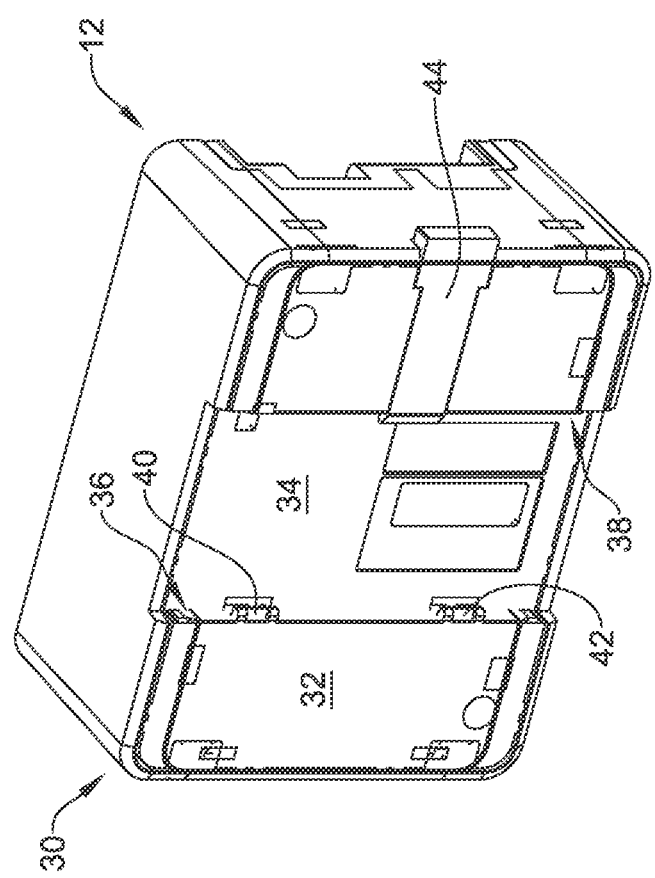
FIG. 3 is a rear perspective view of an illustrative DIN rail device.

FIG. 3 is a rear perspective view of the DIN rail device 12. The illustrative DIN rail device 12 includes a housing 30 with a rear surface 32. As can be seen, a DIN rail mounting recess 34 is formed within the rear surface 32 of the housing 30. In some instances, the DIN rail mounting recess 34 may be considered as being an elongate DIN rail mounting recess 34. It will be appreciated that the DIN rail mounting recess 34 may be considered as being configured to permit the DIN rail device 12 to be secured in a traditional manner to a standard DIN rail. Accordingly, the DIN rail device 12 can include certain components that allow the DIN rail device 12 to be snapped onto a standard DIN rail.

In some cases, the DIN rail mounting recess 34 may be considered as being rectilinear, with a first side wall 36 on the left (in the illustrated orientation) side of the DIN rail mounting recess 34 and a second side wall 38 on the right side of the DIN rail mounting recess 34. Along the first side wall 36, the illustrative DIN rail mounting recess 34 includes a first stationary mounting latch 40 and a second stationary mounting latch 42. In some cases, there may be only one stationary mounting latch, or there may be three or more stationary mounting latches. Along the second side wall 38, the illustrative DIN rail mounting recess 34 includes a moveable mounting latch 44. The moveable mounting latch 44 may be considered as being biased into its illustrated configuration, in which the moveable mounting latch 44 extends over the DIN rail mounting recess 34. For example, a resilient spring may provide a biasing force to the moveable mounting latch 44.

It will be appreciated that the stationary mounting latches 40 and 42 allow the DIN rail device 12 to be hooked over a top edge of a standard DIN rail and pivoted downward such that the moveable mounting latch 44 first moves back against its biasing and then returns to its biased configuration as the DIN rail device 12 is "snapped" into position on a standard DIN rail. As will be discussed, the stationary mounting latches 40 and 42 as well as the moveable mounting latch 44 allow the DIN rail device 12 to be secured to the illustrative adaptor plate 16.

Figure 4:
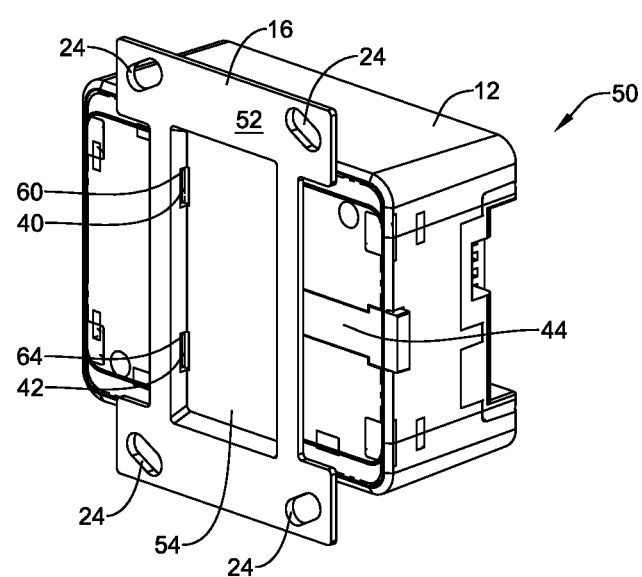
FIG. 4 is a perspective view of an illustrative sub-assembly including an illustrative adaptor plate secured to a DIN RAIL device.
Figure 5:
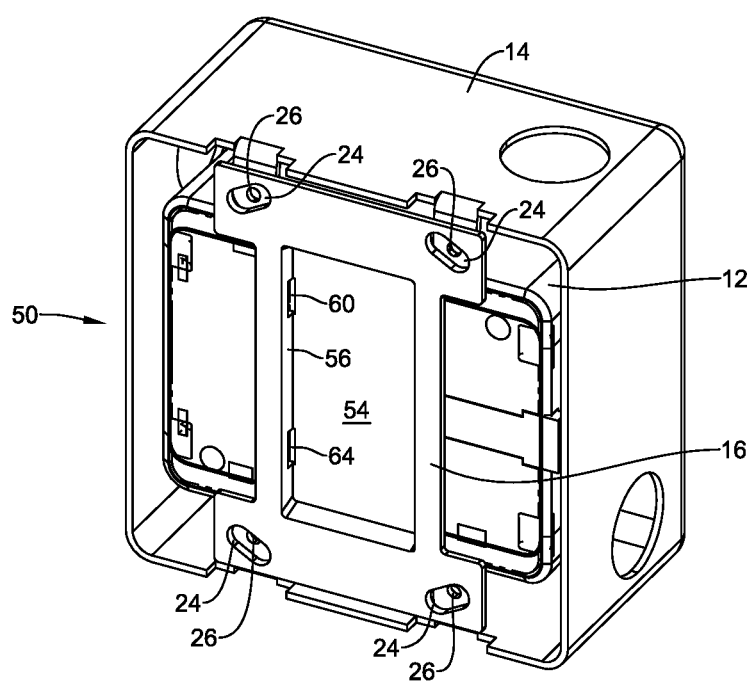
FIG. 5 is a perspective view of the illustrative sub-assembly of FIG. 4, shown disposed within an electrical junction box.
Figure 6:
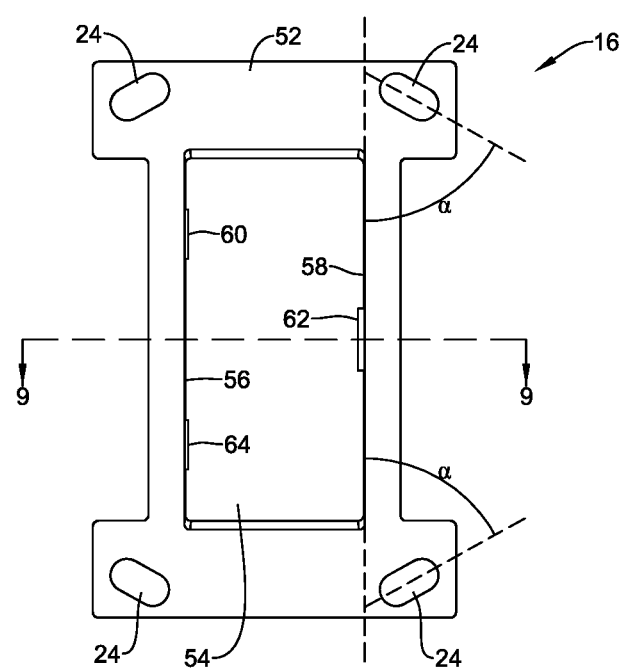
FIG. 6 is a front plan view of an illustrative adaptor plate.

FIG. 4 is a perspective view of an illustrative assembly 50 that includes the adaptor plate 16 secured to the DIN rail device 12, while FIG. 5 shows the illustrative assembly 50 secured within the electrical junction box 14. FIG. 6 is a front plan view of the illustrative adaptor plate 16, showing the features that facilitate the adaptor plate 16 to be secured to both the DIN rail device 12 as well as the electrical junction box 14. The adaptor plate 16 may be considered as including a front plate 52 that is configured to span across at least a portion of a front of the electrical junction box 14. A DIN rail engagement portion 54 extends backward (in the illustrated orientation into the junction box 14) from the front plate 52. As will be shown, the DIN rail engagement portion 54 is configured to fit at least partially into the DIN rail mounting recess 34 of the DIN rail device 12. The illustrative DIN rail engagement portion 54 includes a first side 56, and a second side 58 that is spaced from the first side 56. The second side 58 may be considered as being parallel to the first side 56, for example. The first side 56 may be configured to extend lengthwise along the first side wall 36 of the DIN rail mounting recess 34 and the second side 58 may be configured to extend lengthwise along the second side wall 38 of the DIN rail mounting recess 34.

A first mounting slot 60 may be seen as being disposed along the first side 56 of the DIN rail engagement portion 54. The first mounting slot 60 may be configured to accommodate a first mounting latch (such as but not limited to the stationary mounting latch 40). A second mounting slot 62 may be seen as being disposed along the second side 58 of the DIN rail engagement portion 54. The second mounting slot 62 may be configured to accommodate a second mounting latch (such as but not limited to the moveable mounting latch 44). In some cases, a third mounting slot 64 may be disposed along the first side 56 of the DIN rail engagement portion 54, and may be spaced from the first mounting slot 60. The third mounting slot 64 may be configured to accommodate a third mounting latch (such as but not limited to the stationary mounting latch 42). In some cases, there may only be a single mounting slot on each side 56, 58 of the DIN rail engagement portion 54. The mounting slots 60, 62, 64 may each be elongated slots that extend lengthwise relative to the DIN rail mounting recess 34, for example. With reference to FIG. 4, the stationary mounting latch 40 may be seen extending into the first mounting slot 60 and the stationary mounting latch 42 may be seen extending into the second mounting slot 62.

While the DIN rail engagement portion 54 shown in the Figures is elongated in the vertical direction with respect to the electrical junction box 14, it is contemplated that the DIN rail engagement portion 54 may extend in the horizontal direction relative to the electrical junction box 14 and may be configured to accommodate a DIN rail device 12 that has a DIN rail mounting recess 34 that also extends in the horizontal direction. When so configured, the 3 or 4 gang electrical junction box may be used to secure a larger DIN rail device 12 (larger controller) that has a width dimension that spans 3 or 4 gangs.

The illustrative front plate 52 includes mounting features 24. In some cases, the mounting features 24 may be elongated slots that are aligned at an acute angle relative to either the first side 56 or the second side 58 of the DIN rail engagement portion 54. In a particular case, as illustrated, the mounting features may be elongated slots that are disposed at an angle of about 45 degrees relative to either the first side 56 or the second side 58 of the DIN rail engagement portion 54. This is illustrated in FIG. 6, in which an angle α (alpha) is clearly labeled.

Figure 7:
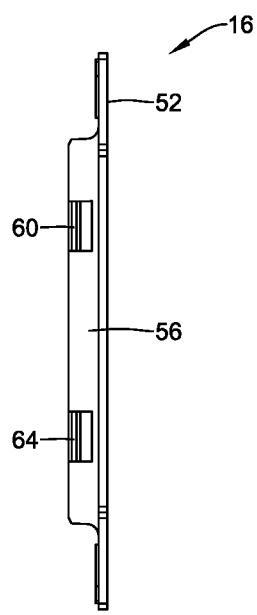
FIG. 7 is a left side view of the illustrative adaptor plate of FIG. 6.
Figure 8:
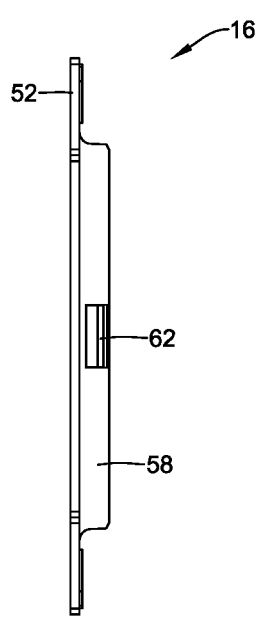
FIG. 8 is a right side view of the illustrative adaptor plate of FIG. 6.
Figure 9:
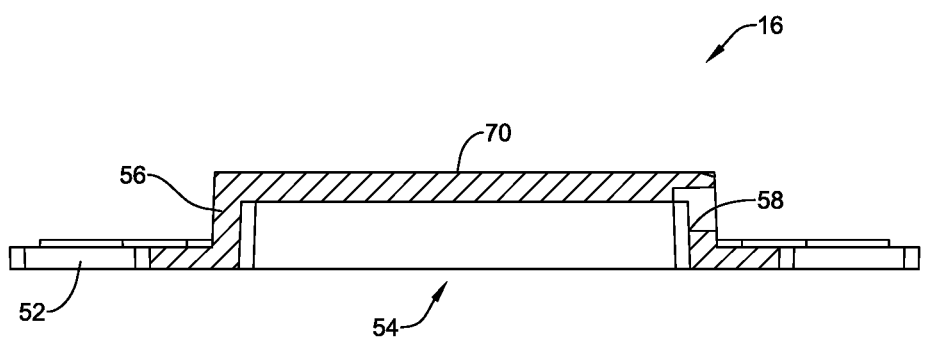
FIG. 9 is a cross-sectional view of the illustrative adaptor plate of FIG. 6, taken along the line 9-9 of FIG. 6.

FIG. 7 is a left side view of the illustrative adaptor plate 16, and FIG. 8 is a right side view of the illustrative adaptor plate 16. FIG. 7 clearly shows the mounting slots 60 and 64 formed within the first side 56 and FIG. 8 clearly shows the mounting slot 62 formed within the second side 58. FIG. 9 is a cross-sectional view taken along the line 9-9 of FIG. 6. The illustrative adaptor plate 16 includes a feature 70 that extends from the first side 56 of the DIN rail engagement portion 54 to the second side 58 of the DIN rail engagement portion 54. In some cases, the feature 70 may provide additional strength to the adaptor plate 16. The feature 70 may not be needed in all cases.

Figure 10:
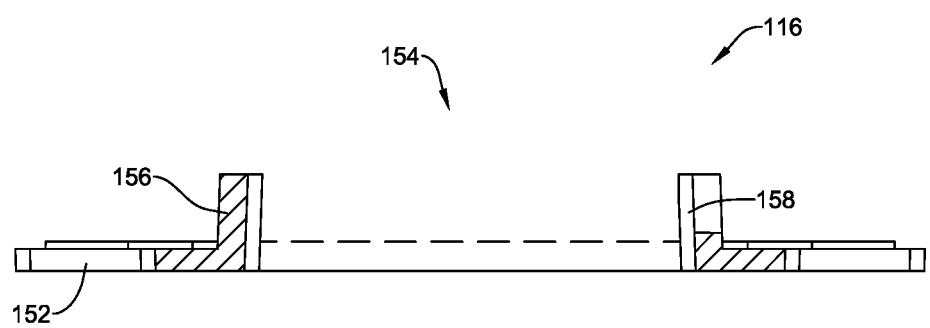
FIG. 10 is a schematic cross-sectional view of another illustrative adaptor plate.

FIG. 10 is a schematic cross-sectional view of an illustrative adaptor plate 116 that is similar to the adaptor plate 16, but does not include the feature 70. In this example, the mounting slots (not visible in this orientation) may be formed within the first and second side walls 156, 158. The first and second side walls 156, 158 may be considered as extending perpendicular to a front plate 152 of the adaptor plate 116.

Figure 11:
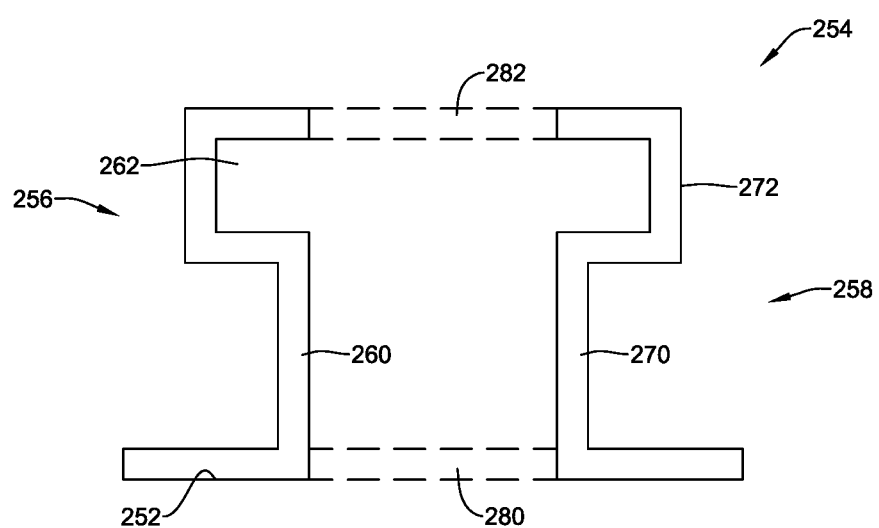
FIG. 11 is a schematic cross-sectional view of yet another illustrative adaptor plate.

FIG. 11 is a schematic enlarged cross-sectional view of an illustrative DIN rail engagement portion 254 that extends back from a front plate 252. A first side wall 256 includes a first linear portion 260 and a first C-shaped portion 262. Similarly, a second side wall 258 includes a second linear portion 270 and a second C-shaped portion 272. A mounting latch such as but not limited to the stationary mounting latches 40 or 42 may fit under the first C-shaped portion 262 and engage first linear portion 260, while a mounting latch such as but not limited to the moveable mounting latch 44 may fit under the second C-shaped portion 272 and engage second linear portion 270. In some cases, the DIN rail engagement portion 254 may include a feature 280 that extends between the first linear portion 260 and the second linear portion 270, but this is not required. In some cases, the DIN rail engagement portion 254 may include a feature 282 that extends between the first C-shaped portion 262 and the second C-shaped portion 272, but this is not required. When so provided, some or all of the mounting slots, such as mounting slots 60, 62 and 64, may not be needed or desired.

ADDITIONAL EMBODIMENTS

An example of the disclosure is an adaptor plate for securing a DIN rail device inside of an electrical junction box. The adaptor plate is securable to a front of the electrical junction box with the DIN rail device disposed within the electrical junction box and includes a front plate that is configured to span across at least a portion of a front of the electrical junction box, the front plate including one or more adaptor plate mounting features located relative to the front plate such that the one or more adaptor plate mounting features align with corresponding mounting features on the electrical junction box. A DIN rail engagement portion extends backward from the front plate and is configured to fit at least partially into an elongated DIN rail mounting recess of a DIN rail device, the DIN rail engagement portion having a first side spaced from a second side, wherein the first side is configured to extend lengthwise along a first side of the DIN rail mounting recess of the DIN rail device, and wherein the second side is configured to extend lengthwise along a second side of the DIN rail mounting recess of the DIN rail device. A first mounting slot is disposed within the first side of the DIN rail engagement portion for receiving a first mounting latch of the DIN rail device that extends into the DIN rail mounting recess from the first side of the DIN rail mounting recess. A second mounting slot is disposed within the second side of the DIN rail engagement portion for receiving a second mounting latch of the DIN rail device that extends into the DIN rail mounting recess from the second side of the DIN rail mounting recess.

Alternatively or additionally, the adaptor plate may further include a third mounting slot disposed within the first side of the DIN rail engagement portion for receiving a third mounting latch of the DIN rail device that extends into the DIN rail mounting recess from the first side of the DIN rail mounting recess.

Alternatively or additionally, the first mounting slot and the second mounting slot may be elongated slots extending lengthwise relative to the DIN rail mounting recess.

Alternatively or additionally, the adaptor plate mounting features may include elongated slots.

Alternatively or additionally, the adaptor plate mounting features may include elongated slots that extends at an acute angle relative to either the first side and the second side of the DIN rail engagement portion.

Alternatively or additionally, the adaptor plate mounting features may include elongated slots that are disposed at an angle of about 45 degrees relative to either the first side and the second side of the DIN rail engagement portion.

Alternatively or additionally, the adaptor plate may be configured to be secured to a double gang electrical junction box.

Alternatively or additionally, the adaptor plate may be configured to be secured to a triple gang or larger electrical junction box.

Alternatively or additionally, the first side of the DIN rail engagement portion may include a first side wall extending perpendicular to the front plate, and the first mounting slot may be formed in the first side wall.

Alternatively or additionally, the second side of the DIN rail engagement portion may include a second side wall extending perpendicular to the front plate and parallel to the first side wall, and the second mounting slot may be formed in the second side wall.

Another example of the disclosure is an assembly that includes an adaptor plate as described herein for securing a DIN rail device inside of an electrical junction box and a cover plate configured to extend over the adaptor plate and to be secured relative to the electrical junction box.

Another example of the disclosure is an assembly for mounting a DIN rail device relative to an electrical junction box. The assembly includes a DIN rail device that is configured to fit within the electrical junction box and an adaptor plate. The DIN rail device includes a housing that includes a rear portion and a recess formed within the rear portion of the housing and configured for securement to a DIN rail, the recess including a stationary mounting latch and a movable mounting latch, the movable mounting latch positioned across the recess and offset from the stationary mounting latch. The adaptor plate includes a front plate that is configured to span across at least a portion of a front of the electrical junction box, the front plate including one or more adaptor plate mounting features located relative to the front plate such that the one or more adaptor plate mounting features align with corresponding mounting features of the electrical junction box. The adaptor plate also includes a DIN rail engagement portion extending backward from the front plate and configured to fit into the recess of the DIN rail device, the DIN rail engagement portion including a first mounting slot for receiving at least part of the stationary mounting latch and a second mounting slot for receiving at least part of the movable mounting latch.

Alternatively or additionally, the DIN rail engagement portion may have a rectilinear profile with at least a first long side and a second long side, with the first mounting slot is disposed within the first long side and the second mounting slot is disposed within the second long side.

Alternatively or additionally, the adaptor plate mounting features within the front plate may include elongated slots that are disposed at an acute angle relative to either the first long side or the second long side of the DIN rail engagement portion.

Alternatively or additionally, the first long side of the DIN rail engagement portion may include a first side wall perpendicular to the front plate, and the first mounting slot may be formed within the first side wall.

Alternatively or additionally, the second long side of the DIN rail engagement portion may include a second side wall perpendicular to the front plate, and the second mounting slot may be formed within the second side wall.

Alternatively or additionally, the assembly may further include a cover plate that is configured to extend over the adaptor plate and to be secured relative to the electrical junction box.

Alternatively or additionally, the stationary mounting latch and the movable mounting latch of the DIN rail device may be configured to extend into the first mounting slot and the second mounting slot, respectively, of the DIN rail engagement portion of the adaptor plate to form a sub-assembly.

Alternatively or additionally, the sub-assembly may be configured to be mounted in the electrical junction box by securing fasteners through the adaptor plate mounting features.

Another example of the disclosure is a method of securing a DIN rail device having an elongated DIN rail mounting recess within an electrical junction box. An adaptor plate is provides that includes a front plate configured to span across at least a portion of a front of the electrical junction box, the front plate including one or more adaptor plate mounting features located relative to the front plate such that the one or more adaptor plate mounting features align with corresponding mounting features on the electrical junction box. The adaptor plate also includes a DIN rail engagement portion extending backward from the front plate and configured to fit at least partially into the elongated DIN rail mounting recess of the DIN rail device, the DIN rail engagement portion having a first side spaced from a second side, wherein the first side is configured to extend lengthwise along a first side of the DIN rail mounting recess of the DIN rail device, and wherein the second side is configured to extend lengthwise along a second side of the DIN rail mounting recess of the DIN rail device. A first mounting slot is disposed within the first side of the DIN rail engagement portion for receiving a first mounting latch of the DIN rail device that extends into the DIN rail mounting recess from the first side of the DIN rail mounting recess. A second mounting slot is disposed within the second side of the DIN rail engagement portion for receiving a second mounting latch of the DIN rail device that extends into the DIN rail mounting recess from the second side of the DIN rail mounting recess. The first mounting latch and the second mounting latch of the DIN rail device are placed in the first mounting slot and the second mounting slot, respectively, of the DIN rail engagement portion of the adaptor plate to form a sub-assembly and the sub-assembly is secured to the electrical junction box by extending fasteners through the one or more adaptor plate mounting features.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. An adaptor plate for securing a DIN rail device inside of an electrical junction box, the adaptor plate securable to a front of the electrical junction box with the DIN rail device disposed within the electrical junction box, the adaptor plate comprising:
   a front plate configured to span across at least a portion of a front of the electrical junction box, the front plate including one or more adaptor plate mounting features located relative to the front plate such that the one or more adaptor plate mounting features align with corresponding mounting features on the electrical junction box;
   a DIN rail engagement portion extending backward from the front plate and configured to fit at least partially into an elongated DIN rail mounting recess of a DIN rail device, the DIN rail engagement portion having a first side spaced from a second side, wherein the first side is configured to extend lengthwise along a first side of the DIN rail mounting recess of the DIN rail device, and wherein the second side is configured to extend lengthwise along a second side of the DIN rail mounting recess of the DIN rail device;
   a first mounting slot disposed within the first side of the DIN rail engagement portion for receiving a first mounting latch of the DIN rail device that extends into the DIN rail mounting recess from the first side of the DIN rail mounting recess; and
   a second mounting slot disposed within the second side of the DIN rail engagement portion for receiving a second mounting latch of the DIN rail device that extends into the DIN rail mounting recess from the second side of the DIN rail mounting recess.

2. The adaptor plate of claim 1, further comprising a third mounting slot disposed within the first side of the DIN rail engagement portion for receiving a third mounting latch of the DIN rail device that extends into the DIN rail mounting recess from the first side of the DIN rail mounting recess.

3. The adaptor plate of claim 2, wherein the first mounting slot and the second mounting slot are elongated slots extending lengthwise relative to the DIN rail mounting recess.

4. The adaptor plate of claim 1, wherein the adaptor plate mounting features comprise elongated slots that extends at an acute angle relative to either the first side and the second side of the DIN rail engagement portion.

5. The adaptor plate of claim 1, wherein the adaptor plate is configured to be secured to a double gang electrical junction box, a triple gang electrical junction box or a larger electrical junction box.

6. An assembly for mounting a DIN rail device relative to an electrical junction box, the assembly comprising:
   a DIN rail device configured to fit within the electrical junction box, the DIN rail device comprising:
      a housing, the housing including a rear portion;
      a recess formed within the rear portion of the housing and configured for
         securement to a DIN rail, the recess including a stationary mounting latch and a movable mounting latch, the movable mounting latch positioned across the recess and offset from the stationary mounting latch; and,
   an adaptor plate comprising:
      a front plate configured to span across at least a portion of a front of the
         electrical junction box, the front plate including one or more adaptor plate mounting features located relative to the front plate such that the one or more adaptor plate mounting features align with corresponding mounting features of the electrical junction box; and,
      a DIN rail engagement portion extending backward from the front plate
         and configured to fit into the recess of the DIN rail device, the DIN rail engagement portion including a first mounting slot for receiving at least part of the stationary mounting latch and a second mounting slot for receiving at least part of the movable mounting latch.

7. The assembly of claim 6, wherein the DIN rail engagement portion has a rectilinear profile with at least a first long side and a second long side, with the first mounting slot is disposed within the first long side and the second mounting slot is disposed within the second long side.

8. The assembly of claim 7, wherein the first long side of the DIN rail engagement portion comprises a first side wall perpendicular to the front plate, and the first mounting slot is formed within the first side wall.

9. The assembly of claim 7, wherein the second long side of the DIN rail engagement portion comprises a second side wall perpendicular to the front plate, and the second mounting slot is formed within the second side wall.

10. The assembly of claim 6, further comprising a cover plate configured to extend over the adaptor plate and to be secured relative to the electrical junction box.

\* \* \* \* \*